United States Patent Office 2,962,368
Patented Nov. 29, 1960

2,962,368

COMPOSITE SOLID ROCKET PROPELLANTS

Eugene D. Guth, Bartlesville, Okla., assignor to Phillips Petroleum Company, a corporation of Delaware No Drawing. Filed Oct. 4, 1957, Ser. No. 688,383

25 Claims. (Cl. 52—.5)

This invention relates to composite solid rocket propellants. In one aspect it relates to a method for preparing novel fuel compositions particularly suitable as binders in solid rocket propellants of the composite type. In another aspect it relates to a method for preparing novel solid rocket propellants of the composite type.

One principal type of solid propellant utilized in rocket motors, such as those adapted to assist the take-off of aircraft, is the composite propellant type which comprises a fuel (or binder) and an oxidizer. The oxidizers utilized in the present invention are inorganic oxidizing salts, such as ammonium nitrate and ammonium perchlorate, and the fuels employed as binders are of the rubber type, such as natural and synthetic rubbers. These propellants can also contain a small percentage of an additive called a burning rate catalyst which is used to control the velocity at which the solid propellant is consumed during operation.

One of the most important solid propellant parameters is the burning rate of the propellant. The basic solid propellant burning equation for restricted solid propellants, such as the type with which this invention is concerned, is expressed as:

$$r = k(p_c)^n$$

where $r$ is the burning rate in inches per second; $p_c$ is the combustion chamber pressure in pounds per square inch; $k$ is a constant which varies with the ambient grain temperature; and $n$ is a constant known as the burning rate exponent.

Inspection of the above burning equation reveals that the sensitivity of the burning rate of the solid propellant to pressure is represented by the burning rate exponent $n$. For stable and practical operation, $n$ should lie between 0 and 1, and preferably should be as low as possible since as $n$ approaches 1 the burning rate is very sensitive to changes in combustion chamber pressure, and vice versa. An indication of this sensitivity can be obtained by plotting logarithm $r$ against $n$ (logarithm $p_c$) + logarithm $k$. Such a plot will generally result in a straight line; the closer the slope of this line approaches 0, the less sensitive is the burning rate of the propellant to the combustion chamber pressure. In fabricating any solid rocket propellant of the restricted type, the fabricator is faced with the problem of preparing a propellant having a burning rate which is relatively insensitive to the combustion chamber pressure.

The fabricator of solid propellants of the composite type often seeks to control the burning rate of a solid propellant by utilizing small amounts of burning rate catalyst, such as Milori blue, and/or ammonium dichromate. Because of the chemical composition of the solid propellant and/or the method by which it is prepared, it is often difficult to obtain propellant which has a burning rate that is determined by or responsive to the amount of burning rate catalyst in the propellant composition. The importance of the burning rate cannot be overestimated since the velocity at which a solid propellant is consumed during operation is determined by the burning rate; where high thrusts are required in a relatively short period of time, solid propellants having fast burning rates are utilized.

Accordingly, an object of this invention is to provide novel composite solid rocket propellants. Another object is to provide a method for preparing a novel composition adapted for use as a fuel and particularly adapted for use as a binder in solid rocket propellants of the composite type. Another object is to provide a novel composition suitable in gas generators. Another object is to provide a method for preparing novel composite solid rocket propellants. Another object is to provide a novel composite solid propellant, the burning rate of which is relatively insensitive to combustion chamber pressure. A further object is to provide a novel composite solid rocket propellant having a fast burning rate. A further object is to provide a novel composite solid rocket propellant which has a burning rate that is responsive to increasing amounts of burning rate catalyst. Further objects and advantages of my invention will become apparent to those skilled in the art from the following discussion and appended claims.

The novel fuel composition of this invention is prepared by a method comprising the steps of mixing a first solution of an inorganic oxidizing salt, such as ammonium perchlorate, dissolved in an organic polar solvent, such as acetone, with a second solution of a vulcanizable rubbery substance containing unsaturated carbon to carbon bonds, such as natural or synthetic rubber (e.g., butadiene/methylvinylpyridine), dissolved in an organic, relatively non-polar solvent, such as benzene, which is miscible with the aforementioned first solvent. This mixing step results in coprecipitation of the inorganic oxidizing salt and the vulcanizable rubbery substance. The resulting coprecipitate is recovered from the solvent mixture by filtration, decantation, or the like, and then dried.

The recovered coprecipitate can advantageously be employed as a fuel composition since it has a relatively high heat value and can be readily ignited and burned to furnish combustible gaseous products having high heat values. This coprecipitate can be cured and fabricated in the form of cubes, cylinders, or any other desired shape, and can be used for such applications as portable heating torches, ignition material for charcoal or coal, heat sources for stoves, water heaters, and the like. Where low molecular weight fuel gases are needed, such as propane and/or butane, the rubbery material used in forming the coprecipitate can be a polymer which thermally decomposes to give these gases at a controlled and predictable rate; these gases can be burned directly or may be conducted to a storage tank for future use.

Even though the coprecipitate contains only a minor amount of oxidizer, the combustion of the coprecipitate is self-sustaining. It has about 91 percent of the B.t.u. value of the rubber it contains. The combustible gases issuing from the coprecipitate willl generally amount to about 88 percent of the weight of the coprecipitate. These gases will have a B.t.u. value approximating those hydrocarbons generally in most rubbers. Upon burning the coprecipitate, the initial temperature will be in the range of about 200–300° C.

I have found that this coprecipitate is especially useful as a fuel or binder in composite solid rocket propellants. Such propellants are characterized by a relatively fast burning rate which is responsive to increasing amounts of burning rate catalyst, such as Milori blue and/or ammonium dichromate. Moreover, solid rocket propellants utilizing the novel fuel composition of this invention have a burning rate which is relatively insensitive to combustion chamber pressures.

These novel solid propellants can be prepared by intimately mixing the fuel composition, prepared as described above and hereafter designated as coprecipitated binder, with requisite amounts of solid inorganic oxidizing salts, such as ammonium nitrate, burning rate catalyst, and the various compounding ingredients commonly employed in making composite propellants having rubbery binders, such as oxidation inhibitors, reinforcing agents, wetting agents, modifiers, vulcanizing agents, curing agents, accelerators, and like additives used to work the resulting propellant composition into the extrudable or moldable mass. The mixing of the coprecipitated binder, oxidizer, and other compounding materials can be done in any type of mechanical mixer, such as a Baker-Perkins dispersion blade mixer. The consolidated propellant composition can be formed into a grain having any desired shape or geometry such as grains of the internal, external, end, and internal-external-burning types. The molded or extruded grains can be restricted with any suitable and well known restricting material, such as rubber, and the whole cured according to known techniques, for example, at atmospheric pressure for 48 hours at 170° F. in a circulating air oven.

The oxidizing materials employed in preparing the coprecipitated binder are inorganic oxidizing salts including ammonium, alkali metal, and alkaline earth metal salts of nitric, perchloric, or chloric acids, and mixtures thereof. Suitable oxidizing materials representatively include sodium, potassium, magnesium and ammonium perchlorates, lithium and strontium chlorides, and potassium, sodium, calcium and ammonium nitrates. I have found that ammonium perchlorate is especially suitable as the oxidizing material used in the preparation of the coprecipitated binder.

The vulcanizable rubbery materials containing unsaturated carbon to carbon bonds employed in the preparation of the coprecipitated binder include natural and synthetic rubbers, as, for example, butadiene-styrene, Perbunan, butyl, GR-I, GR-S, neoprene, polybutadiene, acrylonitrile-styrene, liquid polysulfide rubbers, and the like. Especially useful and preferred rubbery materials can be prepared by copolymerizing a conjugated diene, such as 1,3-butadiene, with a vinyl heterocyclic nitrogen compound, such as 2-methyl-5-vinylpyridine, to yield a rubbery material such as those copolymers described in the copending application, Serial No. 284,447, filed April 25, 1952, by William B. Reynolds et al., and those described in the copending application Serial No. 561,943, filed January 27, 1956, by William B. Reynolds et al. The conjugated dienes described in the aforementioned copending applications, and useful in preparing the rubbery materials utilized in this invention, are those containing 4 to 6 carbon atoms per molecule and representatively include 1,3-butadiene, isoprene, piperylene, methylpentadiene, 2-methyl-1,3-butadiene, 2,3-dimethyl-1,3-butadiene, chloroprene, and the like. Various alkoxy derivatives, such as methoxy and ethoxy, and cyano derivatives of these conjugated dienes are also applicable and representatively include phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene.

The vinyl heterocyclic nitrogen base compounds, described in the aforementioned applications, and useful as co-monomers in the preparation of the rubbery materials of this invention, are those which are copolymerizable with a conjugated diene and contain a $$CH_2=\overset{R}{\underset{|}{C}}—$$

group where R is a hydrogen atom or a methyl radical. One or two vinyl groups may be present, and also alkyl groups may be present attached to the heterocyclic ring as long as there are not more than 12 carbon atoms in the total of these alkyl groups. These heterocyclic nitrogen compounds include the vinyl substituted pyridines, vinyl substituted quinolines, and vinyl substituted isoquinolines. Representative vinyl heterocyclic nitrogen compounds include 2-vinylpyridine, 5-vinylpyridine, 2-methyl-5-vinylpyridine, 5-ethyl-2-vinylpyridine, 2,6-diethyl-4-vinylpyridine, 2-isopropyl-4-nonyl-5-vinylpyridine, 3-vinyl-5-ethoxypyridine, 2-vinylquinoline-2-vinyl-4-ethylquinoline, 3-vinylisoquinoline, 1,6-dimethyl-3-vinylisoquinoline, 3-methyl-2,5-divinylpyridine, 2-isopropenylpyridine, 2-vinylquinoline, 1-vinylisoquinoline, 2,5-divinylquinoline, 6,7-dimethyl-2,5-divinylquinoline, and the like.

In the preparation of the aforementioned copolymers of conjugated dienes with vinyl heterocyclic nitrogen compounds, the amount of conjugated diene employed is preferably in the range between 75 and 94 parts by weight per 100 parts monomers and the vinyl heterocyclic nitrogen compound is in the range between 25 and 5 parts. Terpolymers are applicable as well as copolymers and in the preparation up to 50 weight percent of the conjugated diene can be replaced with another polymerizable compound such as, styrene, acrylonitrile and the like.

The preferred readily available copolymer employed as the rubbery material in the practice of this invention is a copolymer prepared from 90 parts by weight of 1,3-butadiene and 10 parts by weight of 2-methyl-5-vinylpyridine, this copolymer hereinafter abbreviated Bd/MVP. This copolymer is polymerized to a Mooney (ML-4) plasticity value in the range of 10–40, preferably in the range of 15–25, and may be masterbatched with 5–20 parts of Philblack A, a carbon black, per 100 parts of rubber.

The organic polar solvents used to dissolve the inorganic oxidizing salt in the preparation of the coprecipitated binder can be any solvent which will dissolve the salt and be miscible with the organic, relatively non-polar solvent used to dissolve the rubbery material. Representative organic polar solvents include acetone, methyl alcohol, isopropyl alcohol, and the like.

Sufficient organic polar solvent can be employed to prepare a solution having a salt concentration of about 30 to 100 percent of the saturated solution; a substantially saturated salt solution is preferred.

The organic, relatively non-polar solvent employed to dissolve the rubbery material used in preparing the coprecipitated binder can be any organic solvent which will satisfactorily dissolve the rubbery material and which is miscible with the aforementioned organic polar solvent. Representative organic, non-polar solvents include benzene, toluene, cyclohexane, cumene, methylcyclohexane, and suitable refinery streams such as a $C_6$ to $C_9$ fraction of platformate, and the like. Sufficient organic non-polar solvent is employed to give a solution with a rubber concentration of about 2 to 10 grams per 100 grams solvent, preferably 8 to 10 grams per 100 grams solvent.

The oxidizing material which is mechanically mixed with the aforementioned plasticized coprecipitated binder can be any of the aforementioned inorganic oxidizing salts used in the preparation of the coprecipitated binder. I have found that ammonium nitrate is especially suitable as the oxidizing material that is mixed with the coprecipitated binder.

Suitable burning rate catalysts which can be incorporated include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamburg blue, laundry blue, washing blue, Williamson blue, and the like. Other burning rate catalysts such as copper chromite, ammonium dichromate, potassium dichromate, sodium dichromate, and the like can also be used. I have found that Milori blue, copper chromite, and ammonium dichromate, and mixtures thereof, are particularly useful as burning rate catalysts in preparing the solid propellants of this invention.

In preparing the solid propellants of this invention, the coprecipitated binder (plasticized with a plasticizer, such as dibutyl phthalate) is mechanically mixed on a roll mill, or the like, with the requisite amount of solid inorganic oxidizing material pulverized preferably to sizes in the range between 30 and 200 microns and added in portions. During the mixing step, the burning rate catalyst and other compounding agents are added. Such compounding ingredients include vulcanization agents, such as sulfur and zinc oxide, antioxidants, such as Flexamine (a mixture of a complex diaryl amine-ketone reaction product and N,N' diphenyl -p-phenylenediamine), vulcanization accelerators, such as, butyraldehyde-butylideneaniline reaction products, and the like. In addition, many other known compounding ingredients can be employed such as those described in the aforementioned copending application. The consolidated product can then be extruded, cast, or molded into any desired size and shape, and cured.

The following empirical formulation or recipe generally represents the coprecipitated binder compositions useful in preparing the solid propellants of this invention.

TABLE I

| Ingredient | Parts |
| --- | --- |
| Inorganic oxidizing salt (e.g., ammonium perchlorate). | 1-90, preferably 1-50. |
| Rubber (e.g., Bd/MVP) | 99-10, preferably 99-50. |

TABLE II

The following empirical formulation or recipe generally represents the solid propellant compositions prepared by this invention.

| Ingredient | Parts per 100 parts of rubber | Parts by weight |
| --- | --- | --- |
| Coprecipitated binder and other compounding ingredients | | 10-45 |
| Coprecipitated binder | 100 | |
| Reinforcing agent | 10-30 | |
| Plasticizer | 10-30 | |
| Silica | 0-20 | |
| Metal oxide | 0-5 | |
| Antioxidant | 0-5 | |
| Wetting agent | 0-2 | |
| Accelerator | 0-2 | |
| Sulfur | 0-2 | |
| Oxidizer | | 90-55 |
| Burning rate catalyst | | 0-30 |

The aforementioned propellants of this invention also have utility as auxiliary power units where low-temperature gases are required, for example, in gas generators where the gas temperature must be sufficiently low to prevent damage to metal components with which the gas may come into contact. Thus, when booster rockets are used to start turbojets, it is desirable to keep the temperature below about 1500° F. The propellant compositions of this invention can be used for this service since they can be fabricated to give a flame temperature in the range between about 1000 and 1500° F., with burning rates in the range between about 0.05 to 0.15 inch per second at 1000 p.s.i. In using these propellants for this service, the oxidizer used in preparing the coprecipitated binder is preferably ammonium perchlorate. If ammonium nitrate is used alone as the sole oxidizer in preparing the coprecipitate, the flame temperature of the propellant is generally too high unless inorganic combustion catalysts are incorporated. In preparing the propellant compositions for this service, the ratio of rubber to ammonium perchlorate in the coprecipitated binder will be in the range of about 5:1 to 15:1, or about 7 to 20 parts of oxidizer per 100 parts of rubber. About 25 to 45 parts of the coprecipitated binder is mechanically mixed with about 75 to 55 parts of oxidizer, preferably ammonium nitrate, the resulting composition being extruded or molded to the desired size and shape, and cured, e.g., at a temperature in the range of about 150 to 250° F. for several hours.

The invention and advantages to be obtained thereby are set forth and illustrated in the following examples.

*Example I*

A coprecipitated binder composition was prepared in the following manner.

A solution of 19.8 g. of $NH_4ClO_4$ in 1800 ml. of acetone at 25° C. was prepared. Another solution of 35 g. of a 90/10 copolymer of 1,3-butadiene and 2-methyl-5-vinylpyridine in 90 ml. of benzene at 25° C. was prepared. This copolymer was prepared by emulsion polymerization. The two solutions were mixed together by pouring them in a vessel and stirring the resulting mixture; the acetone solution was added about twice as fast as the benzene solution. A coprecipitated solid comprising $NH_4ClO_4$ and Bd/MVP formed immediately. The solution mixture was decanted and the recovered coprecipitate was placed on a tray in an oven at 60° C. to remove the occluded solvents. The yield was about 38–40 g. of coprecipitate containing about 9 percent $NH_4ClO_4$ intimately dispersed in the copolymer.

A portion of the coprecipitated product was held over the mouth of a test tube and ignited with a lighted match. The coprecipitate ignited immediately and was dropped into the test tube where it burned steadily and evolved combustible gases which burned steadily when ignited as they issued from the mouth of the test tube. A carbonaceous residue remained in the test tube and burned when reignited.

*Example II*

A solid propellant was prepared in the following manner, utilizing a coprecipitated binder prepared as described in Example I. For purposes of comparison, three other solid propellants were prepared by prior art methods, utilizing binder compositions comprising copolymer rubbery material which did not contain any inorganic oxidizing salt (these binder compositions are hereafter designated as low energy binders).

A coprecipitate binder composition, prepared as described in Example I, was mixed on a roll mill with a plasticizer (ZP-211, a high molecular weight polyether), and a curative (magnesium oxide). A mixture of an oxidizer, (ammonium nitrate which was ground in a Mikropulverizer to a size finer than 200 microns), a reinforcing agent (carbon black), and a burning rate catalyst (Milori blue-ammonium dichromate), was blended into the plasticized coprecipitated binder composition, each portion of the dry blend being thoroughly milled into the plasticized binder before the next portion of dry blend was added.

After all of the dry blended material was added and milled throughly, the consolidated product was removed from the mill and pressed in a mold at 8000 p.s.i. The molded product was cured at 180° F. for 24 hours, after which time it was cut using a band saw into suitable specimens or strands measuring about 3/16 inch in diameter and 6 inches in length. Propellant prepared in this manner is hereinafter designated Propellant A.

The propellants utilized for purposes of control and comparison, and prepared by merely mechanically mixing low energy binder compositions with oxidizing material on a roll mill, molded, cured, and cut in a manner similar to the preparation of Propellant A, are hereinafter designated Propellants B, C, and D. Propellants C and D contained some ammonium perchlorate (ground to a size finer than 30 microns) which was milled into the plasticized low energy binder composition along with the ammonium nitrate oxider.

The compositions of the various propellants are set forth in the following table.

TABLE III

| Ingredient | Propellant (parts by weight) | | | |
|---|---|---|---|---|
| | A | B | C | D |
| Coprecipitated binder | 16.5 | 0 | 0 | 0 |
| Low energy binder | 0 | 16.5 | 16.5 | 16.5 |
| Ammonium nitrate | 83.5 | 83.5 | 83.5 | 83.5 |
| Milori blue | 3.0 | 2.0 | 2.0 | 2.0 |
| Ammonium dichromate | 4.0 | 4.0 | 4.0 | 4.0 |
| Coprecipitated ammonium perchlorate | 1.0 | 0 | 0 | 0 |
| Milled-in ammonium perchlorate | 0 | 0 | 2.0 | 4.0 |

The binders of the above propellants had the following compositions:

TABLE IV

| Ingredient | Parts per 100 parts of rubber | |
|---|---|---|
| | Coprecipitated binder | Low energy binder |
| Copolymer (90–10 Bd/MVP) | 100 | 100 |
| Coprecipitated $NH_4ClO_4$ | 9 | 0 |
| Philblack A | 22 | 22 |
| ZP-211 [a] | 20 | 20 |
| Flexamine [b] | 3 | 3 |
| Magnesium oxide | 5 | 5 |

[a] A topped fraction of TB-90B, di-(1,4,7-trioxaundecyl)methane.
[b] A physical mixture containing 65% of a complex diarylamine ketone reaction product and 35% of N,N'-diphenyl-paraphenylenediamine.

The burning characteristics of the above-described propellants were evaluated. The burning rates at 600 and 1000 p.s.i. and the calculated pressure exponents $n$ are set forth in the following table.

TABLE V

| Propellant | Chamber pressure | | Pressure exponent, $n$ |
|---|---|---|---|
| | 600 p.s.i. | 1,000 p.s.i. | |
| A | 0.194 | 0.240 | 0.42 from 200 to 1,700 p.s.i. |
| B | 0.185 | 0.250 | 0.59 from 200 to 1,700 p.s.i. |
| C | 0.193 | 0.246 | 0.45 from 200 to 1,770 p.s.i. |
| D | 0.190 | 0.265 | 0.55 from 200 to 1,775 p.s.i. |

As indicated by Table V, Propellant A, prepared by the present invention utilizing coprecipitated binder, had a lower pressure exponent than Propellants B, C, and D, indicating that it was less sensitive to combustion chamber pressures than those propellants which utilized low energy binder compositions. Moreover, Propellant A exhibited a somewhat faster burning rate at 600 p.s.i. than Propellant B and Propellants C and D, which contained more oxidizing material. This faster burning rate and lower pressure exponent for Propellant A can be attributed to the coprecipitation technique of this invention whereby binder compositions having higher energy values are obtained.

*Example III*

Two propellants were prepared according to this invention in a manner similar to Propellant A above but containing additional Milori blue burning rate catalyst. The compositions of these two propellants, hereinafter designated Propellants E and F, are set forth in the following table.

TABLE VI

| Ingredient | Propellant (parts by weight) | |
|---|---|---|
| | E | F |
| Coprecipitated binder | 16.5 | 16.5 |
| Ammonium nitrate | 83.5 | 83.5 |
| Milori blue | 4.0 | 6.0 |
| Ammonium dichromate | 4.0 | 4.0 |
| Coprecipitated ammonium perchlorate | 1.0 | 1.0 |

The burning characteristics for Propellants E and F are set forth in the following table.

TABLE VII

| Propellant | Chamber pressure | | Pressure exponent, $n$ |
|---|---|---|---|
| | 600 p.s.i. | 1,000 p.s.i. | |
| E | 0.284 | 0.362 | 0.47 from 200 to 1,740 p.s.i. |
| F | 0.298 | 0.388 | 0.51 from 250 to 1,750 p.s.i. |

Comparison of the burning characteristics of Propellants A, E, and F show that the burning rates of propellants prepared by this invention are responsive to the burning rate catalyst content and that increasing the catalyst content results in increased burning rates without increasing the sensitivity of the same to the combustion chamber pressure. The applicant knows from past experience that the burning rates of propellants prepared in a manner similar to Propellant A, E, and F, except using low energy binders, are not as a general rule as responsive to increased catalyst content.

*Example IV*

The marked effect of using coprecipitated binders in the fabrication of solid propellants was graphically demonstrated by preparing two propellants according to this invention in a manner similar to Propellants A, E, and F, but containing a low oxidizer level. These propellants are hereinafter designated Propellants G and H and their compositions were as follows:

TABLE VIII

| Ingredient | Propellant | |
|---|---|---|
| | G | H |
| Coprecipitated binder | 40.0 | 25.0 |
| Ammonium nitrate | 60.0 | 75.0 |
| Milori blue | 2.0 | 2.0 |
| Ammonium dichromate | 4.0 | 4.0 |
| Coprecipitated ammonium perchlorate | 2.4 | 1.5 |

The burning characteristics for Propellants G and H were as follows:

TABLE IX

| Propellant | Chamber pressure | | Pressure exponent, $n$ |
|---|---|---|---|
| | 600 p.s.i. | 1,000 p.s.i. | |
| G | 0.099 | 0.125 | 0.44 from 300 to 1,730 p.s.i. |
| H | 0.172 | 0.217 | 0.45 from 300 to 1,748 p.s.i. |

The applicant knows from past experience that propellants similar to Propellant G but utilizing a low energy binder composition cannot be made to burn with an oxidizer level as low as 60 parts by weight, and that propellants similar to Propellant H but likewise utilizing low energy binder compositions will only burn at a very low velocity when the ammonium nitrate oxidizer content is 75 parts by weight. Thus, the fact that Propellants G and H burn in the manner indicated in Table VIII can be attributed to the coprecipitation technique of this invention.

Example V

The advantages of this invention were also realized by preparing three further propellants hereinafter designated Propellants I, J, and K, in a manner similar to Propellant A, and comprising the same amounts of ingredients as set forth in Table II. The burning characteristics of these three further propellants are set forth in the following table.

TABLE IX

| Propellant | Chamber Pressure | | Pressure Exponent, $n$ |
| --- | --- | --- | --- |
| | 600 p.s.i. | 1,000 p.s.i. | |
| I | 0.296 | 0.263 | 0.39 from 200 to 600 p.s.i. |
| J | 0.190 | 0.285 | 0.32 from 250 to 600 p.s.i. |
| K | 0.180 | 0.245 | 0.39 from 300 to 600 p.s.i. |

The burning data in Table IX show that the fast burning rates are relatively insensitive to combustion chamber pressures, especially in the range of 200–600 p.s.i., as indicated by the reproducible pressure exponents.

Various modifications and alterations of this invention will become apparent to those skilled in the art without departing from the scope and spirit of this invention; and it is to understood that the foregoing discussion merely represents preferred embodiments which do not unduly limit my invention.

I claim:

1. A method for preparing a fuel composition comprising mixing a first solution of an inorganic oxidizing salt in an organic polar solvent with a second solution of a vulcanizable rubber containing unsaturated carbon-to-carbon bonds in an organic non-polar solvent miscible in the said polar solvent to form a coprecipitate of said salt and said rubber, and recovering said coprecipitate from the resulting solvent mixture, said inorganic oxidizing salt and said rubber being employed in amounts such that said coprecipitate contains about 1–90 parts of said inorganic oxidizing salt and about 99–10 parts of said rubber.

2. The method according to claim 1 wherein said oxidizing salt is selected from the group consisting of ammonium, alkali metal, and alkaline earth metal salts of an acid selected from the group consisting of nitric, perchloric, and chloric acids.

3. The method according to claim 1 wherein said oxidizing salt is ammonium perchlorate.

4. The method according to claim 1 wherein said rubber is a copolymer of 1,3-butadiene and 2-methyl-5-vinylpyridine.

5. A method for preparing a fuel composition comprising mixing a first solution of ammonium perchlorate dissolved in acetone with a second solution of a copolymer of 1,3-butadiene and 2-methyl-5-vinylpyridine dissolved in benzene to form a coprecipitate of ammonium perchlorate and said copolymer, wherein the amounts of said ammonium perchlorate and said copolymer employed are such that said coprecipitate contains about 1–90 parts of said ammonium perchlorate and about 99–10 parts of said copolymer, and recovering said coprecipitate from the resulting solvent mixture.

6. A fuel composition prepared according to claim 1.

7. A method for preparing a solid propellant comprising mixing a first solution of an inorganic oxidizing salt in an organic polar solvent with a second solution of a vulcanizable rubber containing unsaturated carbon-to-carbon bonds in an organic non-polar solvent miscible in the said polar solvent to form a coprecipitate of said salt and said rubber, recovering said coprecipitate from said solvent mixture, plasticizing the recovered coprecipitate, and mixing about 10–45 parts of the resulting plasticized coprecipitate with about 99–55 parts of further inorganic oxidizing salt to obtain a composite solid propellant, said inorganic oxidizing salt and said rubber being employed in amounts such that said coprecipitate contains about 1–90 parts of said inorganic oxidizing salt and about 99–10 parts of said rubber.

8. The method according to claim 7 wherein said oxidizing salt is selected from the group consisting of ammonium, alkali metal, and alkaline earth metal salts of an acid selected from the group consisting of nitric, perchloric, and chloric acids.

9. The method according to claim 7 wherein said oxidizing salt in said polar solvent is ammonium perchlorate and said further oxidizing salt is ammonium nitrate.

10. The method according to claim 7 wherein said rubber is a copolymer of 1,3-butadiene and 2-methyl-5-vinylpyridine.

11. A method for preparing a solid propellant, comprising mixing a first solution of ammonium perchlorate dissolved in acetone with a second solution of a copolymer of 1,3-butadiene and 2-methyl-5-vinylpyridine dissolved in benzene to form a coprecipitate of ammonium perchlorate and said copolymer, wherein the amounts of said ammonium perchlorate and said copolymer employed are such that said coprecipitate contains about 1–90 parts of said ammonium perchlorate and about 99–10 parts of said copolymer, recovering said coprecipitate from the resulting solvent mixture, plasticizing the recovered coprecipitate, and milling about 10–45 parts of the resulting plasticized coprecipitate with about 99–55 parts of ammonium nitrate and about 0–30 parts of burning rate catalyst selected from the group consisting of ferrocyanides, copper chromite, ammonium dichromate, potassium dichromate, and sodium dichromate, to obtain a composite solid propellant.

12. A solid propellant prepared according to claim 7.

13. A solid propellant prepared according to claim 11.

14. A method for preparing a grain of solid propellant, comprising mixing a first solution of ammonium perchlorate dissolved in an organic polar solvent with a second solution of a rubbery copolymer of 1,3-butadiene and 2-methyl-5-vinylpyridine dissolved in a non-polar solvent which is miscible with said polar solvent, thereby forming a coprecipitate of ammonium perchlorate and said copolymer, wherein said ammonium perchlorate and said copolymer are employed in amounts such that said coprecipitate contains about 1–90 parts of ammonium perchlorate and about 99–10 parts of said copolymer, recovering the resulting coprecipitate from the resulting solvent mixture, drying the recovered coprecipitate, plasticizing the dry coprecipitate, mixing about 10–45 parts of the plasticized coprecipitate with about 99–55 parts of comminuted ammonium nitrate and about 0–30 parts of Milori blue as a burning rate catalyst to form a composite solid propellant composition, fabricating said composition in the form of a grain, and curing said grain.

15. The method according to claim 14 wherein said polar solvent is acetone and said non-polar solvent is benzene.

16. A grain of solid propellant prepared according to claim 2.

17. A grain of solid propellant prepared according to claim 14.

18. A solid propellant prepared according to claim 8.

19. A solid propellant prepared according to claim 9.

20. A solid propellant prepared according to claim 10.

21. A solid propellant prepared according to claim 3.

22. A grain of solid propellant prepared according to claim 4.

23. The method according to claim 1 wherein said vulcanizable rubber is a copolymer of a vinyl substituted heterocyclic nitrogen base and a conjugated diene having 4 to 6 carbon atoms per molecule.

24. A grain of solid propellant prepared according to claim 23.

25. A fuel composition prepared by mixing a first solution of ammonium perchlorate dissolved in acetone with a second solution of a copolymer of 1,3-butadiene and 2-methyl-5-vinylpyridine dissolved in benzene to form a coprecipitate of ammonium perchlorate and said copolymer, said ammonium perchlorate and said copolymer being employed in amounts such that said coprecipitate contains about 1–90 parts of said ammonium perchlorate and about 99–10 parts of said copolymer, and recovering said coprecipitate from the resulting solvent mixture.

References Cited in the file of this patent

UNITED STATES PATENTS

| | | |
|---|---|---|
| 2,042,894 | Hazelzet | June 2, 1936 |
| 2,067,213 | Snelling | Jan. 12, 1937 |
| 2,147,540 | McCauley | Feb. 14, 1939 |
| 2,479,470 | Carr | Aug. 16, 1949 |
| 2,574,466 | Clay et al. | Nov. 13, 1951 |
| 2,740,702 | Mace | Apr. 3, 1956 |